(12) United States Patent
Christopher

(10) Patent No.: US 7,022,019 B2
(45) Date of Patent: Apr. 4, 2006

(54) DRIVE SHAFT ASSEMBLY

(75) Inventor: Hugh Christopher, West Bridgeford (GB)

(73) Assignee: Lear Corporation, Southfield, MI (US)

( * ) Notice: Subject to any disclaimer, the term of this patent is extended or adjusted under 35 U.S.C. 154(b) by 67 days.

(21) Appl. No.: 10/643,023

(22) Filed: Aug. 17, 2003

(65) Prior Publication Data
US 2005/0075175 A1 Apr. 7, 2005

(30) Foreign Application Priority Data
Mar. 5, 2003 (GB) .................................... 0304925

(51) Int. Cl.
*F16C 1/06* (2006.01)

(52) U.S. Cl. ........................ 464/52; 464/180

(58) Field of Classification Search ................ 464/52, 464/53, 180; 297/330, 362.11; 384/281, 384/297; 74/502.4
See application file for complete search history.

(56) References Cited

U.S. PATENT DOCUMENTS

| | | | | |
|---|---|---|---|---|
| 1,692,301 A | * | 11/1928 | Heslewood | ............... 464/52 X |
| 2,761,297 A | * | 9/1956 | Buchsteiner | ................. 464/53 |
| 2,889,695 A | * | 6/1959 | Moeller | ..................... 464/180 |
| 3,408,830 A | * | 11/1968 | Sutaruk et al. | ......... 464/180 X |
| 3,420,072 A | * | 1/1969 | Baier et al. | ............. 464/180 X |
| 5,022,876 A | | 6/1991 | Etter | |
| 5,558,578 A | * | 9/1996 | Uryu et al. | .................... 464/52 |
| 5,997,092 A | | 12/1999 | Slaven | |
| 6,626,060 B1 | * | 9/2003 | Matsuo | .................. 74/502.4 X |
| 6,802,648 B1 | * | 10/2004 | Merot et al. | ............. 384/279 X |

FOREIGN PATENT DOCUMENTS

| | | |
|---|---|---|
| DE | 198 16 278 | 11/1999 |
| DE | 94 22 436 | 5/2002 |
| GB | 870781 | 6/1961 |
| GB | 1126842 | 9/1968 |

OTHER PUBLICATIONS

International Seal and Packing Co. (ISP) Catalogue 300, Berlin, NJ. 1995, p. iii.*

* cited by examiner

*Primary Examiner*—Greg Binda
(74) *Attorney, Agent, or Firm*—MacMillan, Sobanski & Todd, LLC

(57) ABSTRACT

A drive shaft assembly (8) for automotive applications for transmitting a rotary drive. The drive shaft assembly (8) comprising a central flexible rotatable core shaft (14), an outer sleeve (12) surrounding the central flexible core shaft (14) and spaced from the core shaft (14), and at least one elastomeric damper (20) positioned at a location (42) along the length ($l_1$) of the drive shaft assembly (8). The damper (20) extending to and lightly abutting against an outer cylindrical surface of the core shaft (14).

9 Claims, 4 Drawing Sheets

DRIVE SHAFT ASSEMBLY

CROSS REFERENCE TO RELATED APPLICATIONS

This application is a continuation of Great Britain Patent Application No. 0304925.1 filed Mar. 5, 2003, the disclosure of which is incorporated herein by reference.

BACKGROUND OF THE INVENTION

The present invention relates to drive shafts, and in particular to so called flexible drive shafts for transmitting rotary drive used for example in automotive applications and specifically, but not exclusively for powered vehicle seat adjustment.

Flexible drive shafts, known as 'flex shafts', are used in a number of automotive applications to transmit rotary motion from a drive or motor to a remote location (for example a remote gearbox) located away from the drive motor where it is required. In particular, for example, flex shafts are used in powered vehicle seats to drivingly interconnect a motor located centrally underneath the seat to the seat track fore and aft slide mechanisms located towards either side of the base of the seat. The seat track fore and aft slide mechanisms providing for fore and aft adjustment and movement of the seat. Flex shafts may also be used to interconnect other driven seat adjustment mechanisms with a remotely located motor. It will be appreciated that often, for space, noise, or other reasons, it is desirable for the motor unit generating rotary powered drive to be located at a remote location away from the driven adjustment mechanisms. Furthermore in recent vehicle seat arrangements it is proposed to conveniently locate all of the drive motors together in a single unit centrally located on the base of the seat, with flex shafts transmitting the drive from the motors to the various adjustment mechanisms (for example fore and aft powdered seat slides, seat height adjusters, seat back tilt adjusters) of the seat and which are located around the vehicle seat.

Flex shafts conventionally comprise a central rotatable flexible core shaft through which the rotary drive is transmitted. The flexible core shaft is swaged (or otherwise joined) onto the motor output drive shaft (or other drive) at one end of the shaft, and the driven element input shaft (eg. Adjuster box) at the other end of the shaft. The core shaft is located and encased within an outer (stationary) sleeve which protects the centrally rotating core shaft. The outer sleeve may be flexible or stiff, and may be bent or formed along its length into any required shape or path to interconnect between the motor and driven element with the inner flexible core located therein. It should be noted that the term 'flex shaft', or flexible drive shaft, refers to the inner core shaft which is flexible and can be configured into any required path, and does not require the outer sleeve or entire device shaft assembly to be flexible. To prevent the inner core flexible drive shaft for contacting and jamming against the inside of the outer sleeve as the inner shaft rotates, in particular when the shaft is bent, and to reduce noise lubrication grease is packed inside the outer sleeve to fill the annular space between the flexible core shaft and outer sleeve.

In operation the core shaft of flex drive may typically rotate at a range of speeds up to, and beyond, for example 5000 rpm in automotive applications. Whilst flex shafts adequately transmit rotary drive such shafts can, in particular at and over such a wide range of operating speeds as may be required in automotive applications, generate unacceptable noise levels for interior vehicle applications where there is a constant desire to reduce noise from such powered adjustment mechanisms, and a desire for silent operation. Furthermore the noise generated from conventional assembled production flex shafts is not consistent. Substantially identical assembled flex shafts often produce differing amounts of noise, and there is also considerable noise variation over the range of operating speeds.

In addition, installation and assembly of conventional flex shafts can sometimes be difficult and messy. High accuracy assembly tolerances are also required to reduce eccentric running. Induced stresses within the flex shaft due, for example, to assembly and manufacturing misalignment can also be a problem.

It is therefore desirable to provide an improved drive shaft which addresses the above described problems and/or which offers improvements generally.

SUMMARY OF THE INVENTION

According to the present invention there is provided a drive shaft as described in the accompanying claims.

In an embodiment of the invention there is provided a drive shaft assembly for automotive applications for transmitting a rotary drive. The drive shaft assembly comprises a central flexible rotatable core shaft having an outer cylindrical surface, an outer sleeve surrounding the central flexible core shaft and spaced from the core shaft, and at least one elastomeric damper located within the outer sleeve and positioned at a discrete location along the length of the drive shaft assembly. The damper extends to and lightly abuts against the outer cylindrical surface of the core shaft. The drive shaft assembly does not include the conventional lubrication greases packed between the cores shaft and outer sleeve.

Such a drive shaft assembly has been found in operation, to generate significantly less noise than is associated with a similar conventional drive shaft assembly.

Preferably the damper comprises an elastomeric washer with an inner bore defined in the centre, the inner bore corresponding to the outer cylindrical surface of the core shaft.

The damper may have a cross sectional profile which radially tapers to an apex at the defined inner bore of the washer.

Preferably the damper comprises a urethane damper. Alternatively the damper may comprise a rubber damper.

The drive shaft assembly preferably comprising part of a vehicle seat adjustment assembly for transmitting rotary drive from a motor to the vehicle seat adjustment assembly.

In an embodiment the core shaft rotates within an operating speed range with the core shaft. The at least one damper is positioned at a location along the length of the core shaft generally corresponding to a nodal stationary point of an altered natural resonant frequency and/or resonant harmonic frequency amplitude resonant displacement profile of the core shaft such that the thereby altered natural resonant frequency and/or resonant harmonic frequency is substantially outside of the operating range.

Preferably the core shaft rotates within an operating speed range with the core shaft when rotating in isolation, having a calculated natural resonant frequency and/or resonant harmonic frequency within the operating range. The core shaft has at least one point along the length of the core shaft of maximum amplitude resonant displacement at said calculated natural resonant frequency and/or resonant harmonic frequency. The at least one damper is positioned at a location along the length of the core shaft generally corresponding to the at least one point of maximum amplitude resonant displacement of the core shaft. In particular the damper is positioned halfway along the length of the core shaft.

Various objects and advantages of this invention will become apparent to those skilled in the art from the following detailed description of the preferred embodiment, when read in light of the accompanying drawings.

DETAILED DESCRIPTION OF THE INVENTION

Figure 1:
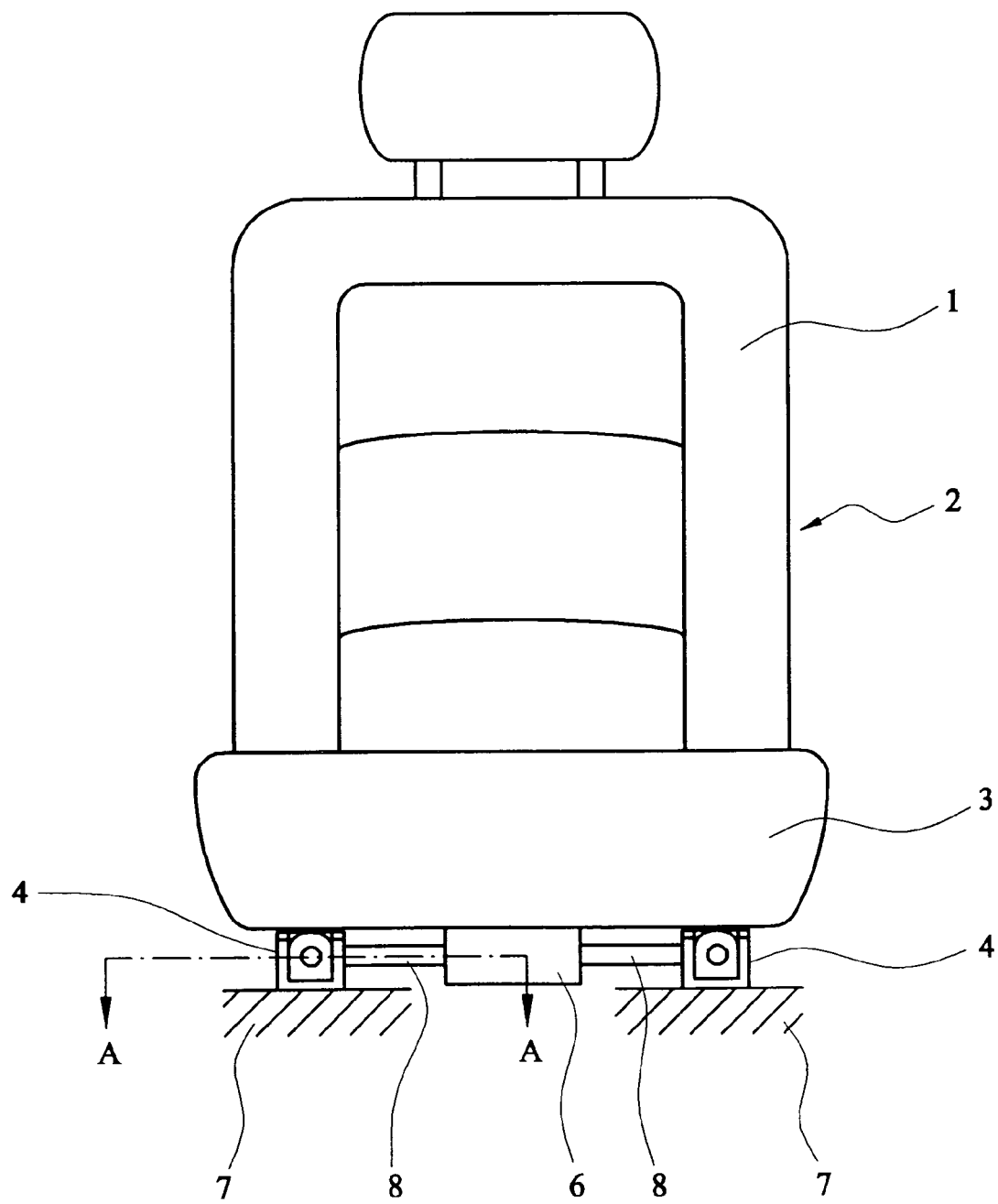
FIG. 1 is a schematic illustration of a vehicle seat including a powered seat track slide arrangement drivingly connected to a drive motor by flex drive shafts.

Referring to FIG. 1 a vehicle seat 2, which includes a seat cushion 3 and seat back 1, is mounted to the floor 7 of a vehicle by a pair of laterally spaced powered seat track slide assemblies 4 fitted beneath the seat cushion 3. The seat track slide assemblies 4 provide for powered fore and aft movement of the seat 2 position within the vehicle. A motor 6 located, as shown centrally on the base of the seat cushion 3, and remotely from the seat track assemblies 4 provides rotary motive drive to the seat track assemblies 4 via a drive shaft assembly 8 which drivingly interconnects a gearbox 10 of the seat track assemblies 4 to the motor 6. It will be appreciated that the seat 2 may also include other powered adjustments mechanisms (for example seat height adjustment, seat back 1 angle adjustment) driven via drive shafts by suitable motors (or other drive arrangements). Furthermore whilst the drive shaft assembly 8 of the invention will be described with reference to a vehicle seat slide 4 arrangement, it is also applicable to such other adjustment mechanisms. The drive shaft assembly 8 of the invention can also be applied to other similar applications.

In such powered arrangements with conventional flex drive shaft assemblies, it has been found that the conventional flex drive shaft assemblies generate significant noise at the rotational drive speeds (up to typically 5000 rpm). Such conventional flex drive shaft assemblies comprise a central rotatable flexible core shaft which transmits the rotary drive. The flexible core shaft is encased within an outer sleeve with lubrication grease packed inside the outer sleeve to fill the annular space between the flexible core shaft and outer sleeve.

In accordance with the invention it has been identified that the noise associated with conventional flex drive shaft assemblies is generated by significant vibration of the assembly at the operating speeds. By the very nature of the construction of flex drive shaft assemblies, with the flexibility of the core shaft, conventional flex drive shafts have a very low Q and a wide natural resonant frequency response. As a result the flex shafts may resonate at the operating rotational speeds with significant displacement of the core shaft. This gives rise to contact and lubricant drag between the flex shaft and outer sleeve, and resultant nosie generation.

Eccentricities and run out of the core shaft within the outer sleeve and its mounting to the motor and output, along with distortion of the shaft and its mounting due to stress during assembly, as well as the packing grease constraining/distorting the core shaft along its length also contribute to vibration of the flex shaft assembly and noise generation. The packing grease also transmits the vibration from the core shaft to the outer sleeve also increases noise generation.

It is based upon this above understanding of the noise generators in conventional flex drive shaft assemblies, the improved flex shaft of the invention has been developed.

Figure 2:
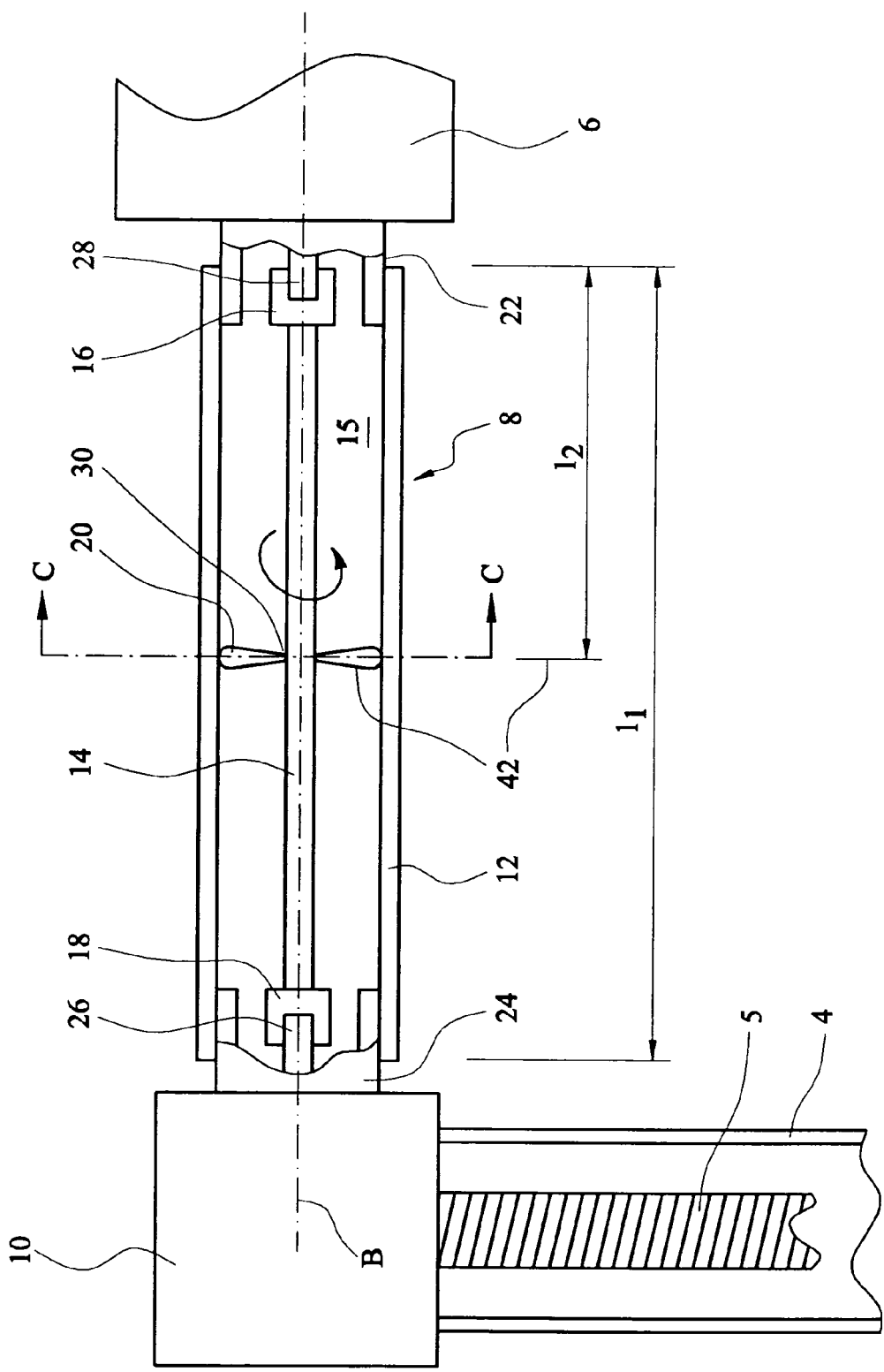
FIG. 2 is a cross sectional illustration, along line A—A of FIG. 1, showing a flex drive shaft assembly of the present invention in more detail.
Figure 3:
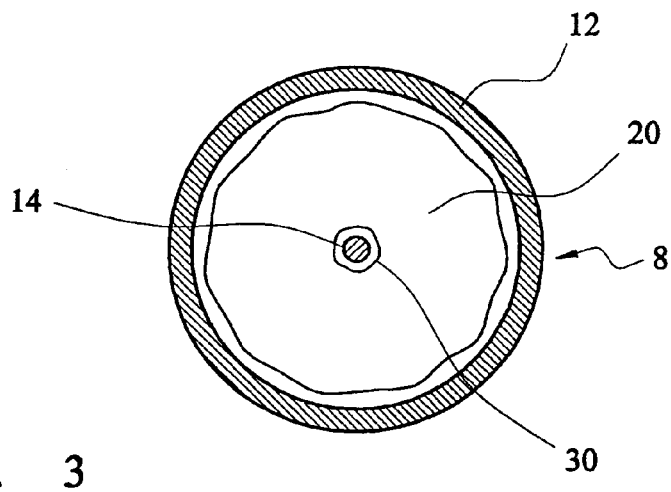
FIG. 3 is a cross sectional illustration along line C—C of FIG. 2 through the flex drive shaft assembly.

Referring to FIGS. 2 and 3, there is shown a more detailed cross sectional illustration of the improved drive shaft assembly 8 in accordance with the invention for use, for example, in drivingly interconnecting the powered seat track slide assembly 4 to the motor 6 as shown in FIG. 1. The powered seat track slide assembly 4, as is known in the art, may typically include a lead screw 5 which is rotatably driven by the seat track gearbox 10 to provide the powered fore and aft seat adjustment. Other seat track adjustments arrangements driven by gearboxes may also be used. The drive shaft assembly 8 drivingly interconnects a rotatably driven input shaft 26 of the gearbox 10 to a rotating output shaft 28 of the motor 6. The motor 6 is located remotely from the seat track assembly 4. Whilst the drive shaft assembly 8 is shown as generally straight, with the gearbox 10 input shaft 26 and motor 6 output shaft 28 generally axially B aligned, it will be appreciated that the drive shaft assembly 8 could be curved or bent to interconnect the gearbox 10 input shaft 26 and motor 6 output shaft 28 which are not axially aligned.

The drive shaft assembly 8 comprises a central flexible core shaft 14, of a similar construction to that of core shafts of conventional flex drive shaft assemblies. The core shaft 14 is arranged, in use, to rotate about its longitudinal axis B, and is drivingly connected to the motor 6 and gearbox 10, to transmit rotary motion from the motor 6 to the gearbox 10. A cylindrical outer sleeve 12, comprising a cylindrical tubular member, surrounds the core shaft 14 and coaxially aligned with and spaced from the core shaft 14, with an annular space 15 defined between the core shaft 14 and outer sleeve 12. The outer sleeve 12 encases and protects the core shaft 14.

In alternative embodiments, and to provide for easier assembly and installation, the outer sleeve 12 may comprise a longitudinal split sleeve comprising a pair of cooperating C shaped cross sectional lengths which when fitted longitudinally together oppositely abut each other to define the cylindrical outer sleeve 12. Suitable means being provided to hold the a pair of cooperating C shaped cross sectional lengths together. Alternatively a single half C shaped section could be used with the other side omitted and the core shaft 14 exposed on the other side.

Annular end cap discs (not shown), including a central bore corresponding to the size of the core shaft 14, may be fitted to the respective ends of the outer sleeve 12 to close of the ends of the outer sleeve 12. The ends of the core shaft 14 fit through, and may also be lightly supported within and by the central bores in end cap discs prior to installation of the drive shaft assembly 8.

Significantly, and in contrast to conventional flex drive shaft assemblies, the annular space 15 between the core shaft 14 and outer sleeve 12 is not filled and packed with lubrication grease. Instead the annular space 15 between the core shaft 14 and outer sleeve 12 is left empty such that the core shaft is substantially unsupported and free along its length.

The drive shaft assembly 8 interconnects the motor 6 with the gearbox 10 of the vehicle seat track slide assembly 4. Coaxial end pieces 16,18 joined to the ends of the flexible core shaft 14 are swaged (or otherwise joined, for example glued with a suitable adhesive fitting) coaxially onto an output shaft 28 of the motor 6 and a driven input shaft 26 of the gearbox 10. The core shaft 14 is thereby rotationally fixed to rotate with the motor output shaft 28, and gearbox input shaft 26 such that the core shaft 14 rotationally drivingly interconnects the motor 6 to the gearbox 10.

The respective ends of the outer sleeve 12 are fit over the outside of cylindrical end bosses 22,24 of the motor and gearbox. These end bosses are concentric with the motor output shaft 28 and gearbox input shaft 26, and support the outer sleeve 12 in position concentric with the core shaft and spaced therefrom.

At a position 42 (as will be explained later) a distance $l_2$ along the length $l_1$ of the drive shaft assembly 8 there is an annular damping washer 20 fitted within the outer sleeve, with the outer profile of the damping washer abutting and locating against the inner surface of the outer sleeve 12. A circular bore 30 is defined in the center of the damping washer 20 with the diameter of the bore 30 corresponding to (preferably slightly smaller than) the outer diameter of core shaft 14 such that the inner bore 30 of the damping washer 20 lightly abuts and contacts against an outer surface of the core shaft 14 at this point 42. The damping washer 20 thereby supports the core shaft 14 at this point 42 within the center of the outer sleeve 12. The damping washer 20 is preferably made from an elastomeric material, for example urethane or rubber. Any eccentricity in the location of the core shaft 14 within the center of the outer sleeve 12 and bore 30 of the damping washer 20 is therefore accommodated by the resilience and deflection of the damping washer 20. In operation, as the core shaft 14 rotates, the damping washer 20 supports the core shaft 14 at this point 42 and locates the core shaft 14 generally centrally within the outer sleeve 12, with any lateral/radial movement of the core shaft 14 being damped and/or constrained by the damping washer 20.

The damping washer 20 preferably has a dished profile, with the cross section of the damping washer 20 having a radially tapering cross sectional profile towards the central bore 30. Specifically, as shown, the thickness (in an axial direction) of the damping washer 20 tapers and decreases form a maximum thickness at a radially outer portions to a minimum thickness, and apex, at the central radially inner bore 30. In a radial direction the damping washer 20 has a triangular or V shaped cross sectional profile. As a result the contact area between the inner bore 30 of the damping washer 20 at the cross sectional apex, and the outer surface of the core shaft 14 is very small such that a light contact is provided with very little frictional contact which would interfere with the core shaft 14 rotation. The bore 30 of the damping washer 20 accordingly provides a knife edge support for the core shaft 14 at the position 42 of the damper washer along the length fo the core shaft 14.

Figure 5A:
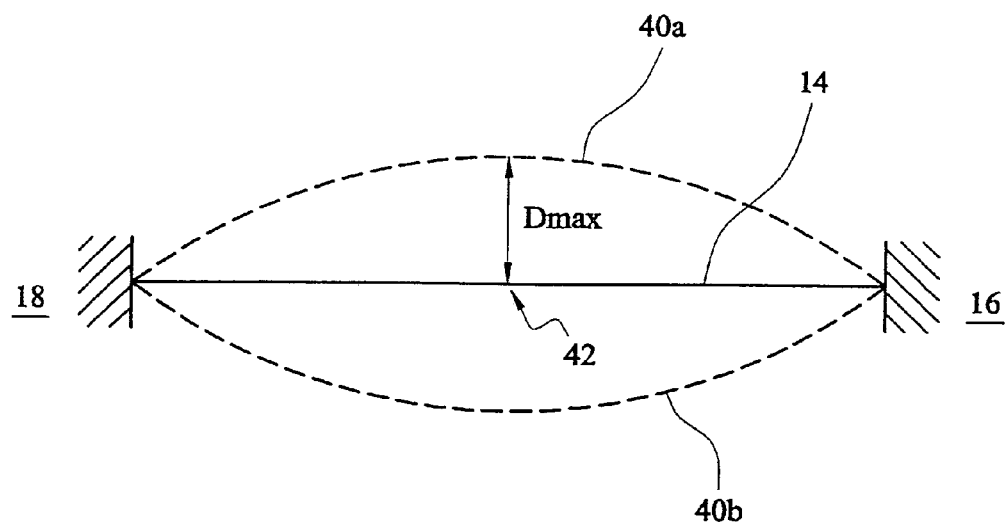
FIG. 5a is a schematic illustration of the natural frequency vibration of the core flex drive shaft of conventional flex shaft.
Figure 5B:
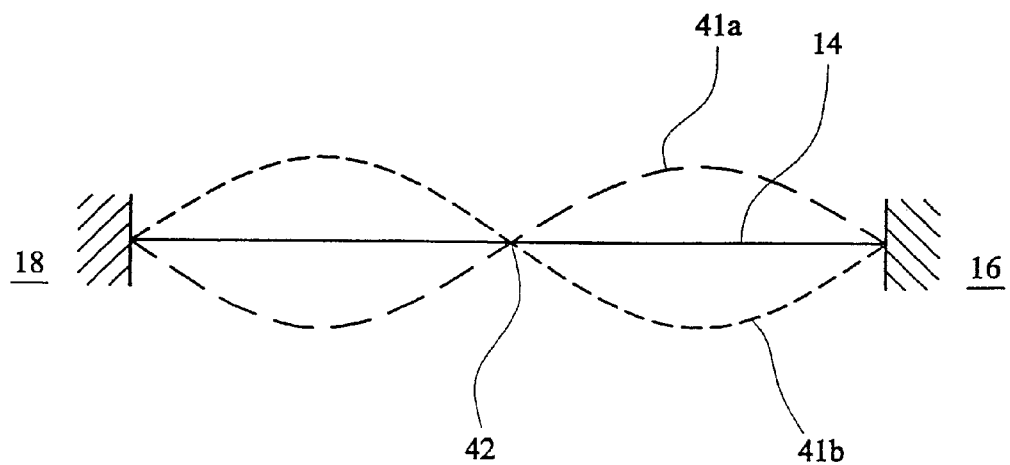
FIG. 5b is a schematic illustration, comparable to to FIG. 5a of the natural frequency vibration, of the core flexible shaft of the flex drive shaft of the first embodiment of the present invention.

The damping washer 20 is located at a position 42 a distance $l_2$ along the length $l_1$ of the core shaft 14. Preferably, in this embodiment, the damping washer 20 is located at a position 42 corresponding to a calculated point of maximum vibrational resonant amplitude lateral displacement at a natural resonant frequency (or harmonic frequency) within the operating range. Specifically, for a freely rotating core shaft 14, the natural resonant frequencies (and harmonics) are calculated within the operating rotational speed ranges. For typical automotive, and in particular vehicle seat adjustments, flex drive shaft assembly applications with which the invention is concerned, the rotational operating speed range is typically in the region of zero to 5000 rpm and the typical length of the flex drive shaft assemblies 8 is approximately 198 mm. At these speeds, and lengths, and using typical core shaft 14 constructions, generally only the first natural resonant frequency needs to be considered. As schematically illustrated in FIG. 5a, at the first natural frequency the core shaft 14 adopts a bowed resonant vibrational profile 40a, 40b as the shaft rotates. This resonant vibrational profile 40a, 40b has a maximum resonant displacement $D_{max}$ at the centre position along the length of the shaft 14, with fixed nodal points at the fixed ends 18 and 16. At this natural resonant vibrational frequency the core shaft 14 vibration has a wavelength corresponding to twice the length l1 of the core shaft 14, with a half sinusoidal wavelength fitting within the length l1 of the core shaft 14. By locating the damper washer 20 at this point 42 of maximum resonant amplitude displacement $D_{max}$, this point 42 becomes a fixed nodal point such that the natural resonant vibrational profile 41a, 41b adopted by the core shaft, at resonance with the damper is altered, and is as shown in FIG. 5b. As shown in FIG. 5b, the altered natural resonant vibrational frequency the core shaft 14 vibration now has a wavelength corresponding to the length l1 of the core shaft 14, with a full sinusoidal wavelength fitting within the length l1 of the core shaft 14. The wavelength of the natural resonant frequency vibration of the core shaft 14 with the damper 20 is therefore half that of the core shaft 14 without the damper 30, and the natural resonant frequency of the core shaft 14 with the damper 20 is accordingly increased and doubled. As a result the natural resonant frequency is typically moved above and outside of the operating speed range of the drive shaft assembly 8. Consequently the vibration of the core shaft 14 is significantly reduced by the location of the damper washer 20 at the initially calculated point 42 of maximum resonant amplitude displacement $D_{max}$, with this point 42 then becoming a vibrational node, or fixed point, for an altered natural frequency resonance of the freely rotating core shaft 14. Accordingly the damper 20 is positioned at a location along the length of the core shaft generally corresponding to a nodal stationary point of the altered natural resonant frequency amplitude resonant displacement profile of the core shaft 14 such that the thereby altered natural resonant frequency is outside of the operating range. The damper 20 thereby provides nodal resonant damping of the core shaft 14.

This resonant damping of the core shaft 14, and alteration of the natural resonant frequency significantly reduces operating vibration of the core shaft 14 and drive shaft assembly 8, and it has been found significantly reduces the operating noise of the drive shaft assembly 8 as compared to a conventional flex drive shaft assemblies. Specifically in testing of a drive shaft assembly 8 shown in FIG. 2, operating within a speed range from 0 to 5000 rpm, with a core shaft length of 198 mm and using a urethane V shaped damper washer, near silent operation was achieved.

If the altered natural resonant frequency of the core shaft 14 with a single damper 20 at the center position 42 is still within the operating range then further damper 20 can instead be fitted at a further calculated points of maximum resonant amplitude displacement $D_{max}$, of a harmonic of the natural frequency vibrational profile to provide an even higher altered natural frequency, in this case at four times (i.e. double the previous altered frequency) the initial natural frequency, and outside of the operating range.

Figure 4:
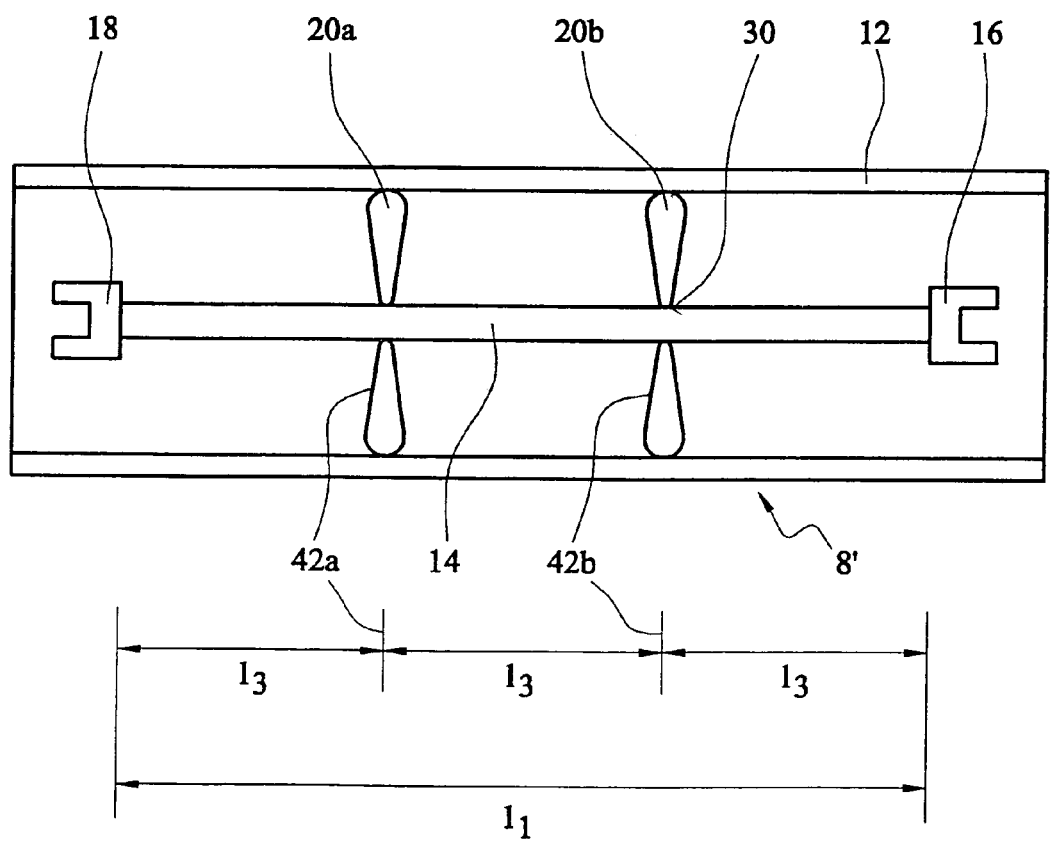
FIG. 4 is a longitudinal cross sectional illustration of a second embodiment of a flex drive shaft assembly of the present invention.

An alternative embodiment of a drive shaft assembly 8 is shown in FIG. 4 which shows the drive shaft assembly 8' of this alternative embodiment in isolation. The drive shaft assembly 8' of this embodiment is fitted and installed in the same manner as the previous embodiment. Corresponding reference numerals for corresponding features are used and only the significant differences will now be described.

In this embodiment a pair of damper washers 20a,20b similar to those of the previous embodiment are located at two positions 42a,42b a distance 13 along the length $l_1$ of the core shaft 14. These damper washers are located at points 41a,42b corresponding to nodal vibrational location of a resonant vibrational amplitude profile (not shown) having a wavelength of two thirds (⅔) that of the vibrational profile shown in FIG. 5a. Accordingly the altered natural frequency is one and a half times (1½ times) that of the core shaft without a damper 30a,30b, and preferably outside of the operating range. Advantageously whilst this embodiment does not alter the resonant frequency as much as the previous embodiment, the natural frequency is altered by an uneven multiple.

In all of the embodiments the core shaft 14 is only supported at discrete points 42 along the length of the core shaft 14. As a result the inner core shaft 14, whilst damped by the damping washers 20 against resonant vibration within the operating speed range, is still substantially free to adopt a natural, non linear, shape running profile to accommodate any eccentricities in the end swage connections to the motor output shaft 28 and gearbox input shaft 26, as well as accommodate any unbalanced loading an run out of the shaft. Since the core shaft 14 is free to adopt such a natural shape stresses in the assembly are also reduced, and wider alignment and assembly tolerances can be used.

In alternative embodiments of the invention the outer sleeve 12 may only extend along part fo the length of the core shaft 14 and only in the region where the damping washers 20 are to be located, with the core shaft 14 being exposed over its remaining length. Alternatively the outer sleeve 12 may comprises an arcuate half sleeve, with a C shaped semi circular cross section. It will be appreciated that such only partially sleeved variants are in complete contrast to conventional flex drive shaft arrangements where an outer sleeve is required to constrain the lubrication grease packed between the core shaft and sleeve.

It will be appreciated by those skilled in the art that other various minor modifications to the above described embodiments are possible without departing from the described invention.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A drive shaft assembly for automotive applications for transmitting a rotary drive, the drive shaft assembly comprising:
    a central flexible rotatable core shaft having an outer cylindrical surface;
    an outer sleeve surrounding the central flexible core shaft and spaced from the core shaft; and
    at least one elastomeric damper located within the outer sleeve and positioned at a location along the length of the drive shaft assembly, the damper extending to and abutting against the outer cylindrical surface of the core shaft;
    wherein the damper comprises an elastomeric washer with an inner bore defined in the center, the inner bore corresponding to the outer cylindrical surface of the core shaft; and
    wherein the damper has a cross sectional profile which radially tapers to an apex at the defined inner bore of the washer thereby providing a knife edge support for the core shaft.

2. A drive shaft assembly as claimed in claim 1 in which the damper comprises a urethane damper.

3. A drive shaft assembly as claimed in claim 1 in which the damper comprises a rubber damper.

4. A drive shaft assembly as claimed in claim 1 comprising part of a vehicle seat adjustment assembly for transmitting rotary drive from a motor to the vehicle seat adjustment assembly.

5. A drive shaft assembly as claimed in claim 1 in which, in use, the core shaft rotates within an operating speed range with the core shaft, when rotating in isolation, having at least one of a calculated natural resonant frequency and resonant harmonic frequency within the operating range; the core shaft having at least one point along the length of the core shaft of maximum amplitude resonant displacement at said at least one of calculated natural resonant frequency and resonant harmonic frequency; the at least one damper is positioned at a location along the length of the core shaft generally corresponding to the at least one point of maximum amplitude resonant displacement of the core shaft.

6. A drive shaft assembly as claimed in claim 1 in which the damper is positioned halfway along the length of the core shaft.

7. A drive shaft assembly as claimed in claim 1 in which, in use, the core shaft rotates within an operating speed range with the core shaft, the at least one damper is positioned at a location along the length of the core shaft generally corresponding to at least one of a nodal stationary point of an altered natural resonant frequency and resonant harmonic frequency amplitude resonant displacement profile of the core shaft such that the thereby at least one of the altered natural resonant frequency and resonant harmonic frequency is substantially outside of the operating range.

8. A drive shaft assembly as claimed in claim 1 in which the at least one damper is positioned at a position one third of the length along the core shaft.

9. A drive shaft assembly as claimed in claim 8 which the at least one damper comprises a first and second damper, the first damper is positioned at a position one third of the length along the core shaft and the second damper is positioned at a position two thirds of the length along the core shaft.

* * * * *